(12) United States Patent
Choudhury

(10) Patent No.: US 9,256,920 B1
(45) Date of Patent: Feb. 9, 2016

(54) IMAGE ENHANCEMENT USING A PATCH BASED TECHNIQUE

(71) Applicant: Sharp Laboratories of America, Inc., Camas, WA (US)

(72) Inventor: Anustup Kumar A. Choudhury, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 10 days.

(21) Appl. No.: 14/341,617

(22) Filed: Jul. 25, 2014

(51) Int. Cl.
G06K 9/32 (2006.01)
G06T 3/40 (2006.01)
G06T 5/00 (2006.01)
G06T 5/50 (2006.01)

(52) U.S. Cl.
CPC . *G06T 3/40* (2013.01); *G06T 5/001* (2013.01); *G06T 5/50* (2013.01); *G06T 2207/20172* (2013.01)

(58) Field of Classification Search
None
See application file for complete search history.

(56) References Cited

U.S. PATENT DOCUMENTS

| 9,117,262 | B2* | 8/2015 | Lin | G06T 5/002 |
| 9,123,138 | B2* | 9/2015 | Lin | G06T 3/40 |
| 2004/0218834 | A1* | 11/2004 | Bishop | H04N 19/587 |
| | | | | 382/299 |
| 2007/0041663 | A1* | 2/2007 | Cho | G06T 3/4084 |
| | | | | 382/299 |
| 2011/0206296 | A1* | 8/2011 | Sakaguchi | G06T 3/4053 |
| | | | | 382/299 |
| 2013/0170767 | A1* | 7/2013 | Choudhury | G06T 3/4053 |
| | | | | 382/260 |
| 2013/0223734 | A1* | 8/2013 | Tuzel | G06T 3/4053 |
| | | | | 382/167 |
| 2015/0154739 | A1* | 6/2015 | Choudhury | G06T 5/00 |
| | | | | 382/266 |

OTHER PUBLICATIONS

Choudhury et al "Image detail enhancement using a dictionary technique" IEEE 2012.*
Yang, J. Wright, T. Huang and Y. Ma., Image super-resolution via sparse representation, IEEE TIP 2010.*
Barnes et al "PatchMatch: A Randomized Correspondence Algorithm for Structural Image Editing" ACM transtatiopns on graphics 2009.*
Korman et al "Coherency sensitive hashing" ICCV 2011.*

* cited by examiner

*Primary Examiner* — Sean Motsinger
(74) *Attorney, Agent, or Firm* — Chernoff Vilhauer McClung & Stenzel, LLP

(57) ABSTRACT

A system for determining a high resolution output image that includes receiving a low resolution image having a first resolution and determining an intermediate high resolution image having a second resolution based upon the low resolution image, where the second resolution is greater than the first resolution. The system determines a set of matches between a patch of the intermediate high resolution image and each of a plurality of degraded high resolution images, then selecting a subset of the set of matches and determining a corresponding reside patch for each of the subset of the set of patches. The system modifies the intermediate high resolution image based upon the corresponding reside patches to determine the high resolution output image.

17 Claims, 5 Drawing Sheets

IMAGE ENHANCEMENT USING A PATCH BASED TECHNIQUE

CROSS-REFERENCE TO RELATED APPLICATIONS

None.

BACKGROUND OF THE INVENTION

The present invention relates to image enhancement using a patch based technique.

Digital images are typically represented as an array of pixels. Similarly, digital video is typically represented as a series of images or frames, each of which contains an array of pixels. Each pixel includes information, such as intensity and/or color information. In many cases, each pixel is represented as a set of three colors, each of which is defined by eight bit color values.

In many cases, image and/or video encoding and/or transmission systems degrade the quality of the image content in order to reduce the storage requirements and/or the bandwidth requirements for transmission. After encoding and/or transmitting an image and/or video, a restoration technique is used on the image and/or video to attempt to recover the high-quality original image content from the degraded version. The degradation of the image content may occur as a result of numerous reasons, such as for example, image transmission, image coding, limitations of capture or display devices, etc. On the other hand, the enhancement of a degraded image attempts to improve the appearance of the image and/or video.

In other cases, the image content is provided at a first lower resolution, such as a progressive or interlaced scanning (e.g., 720×480 pixels). The image content may be provided in a non-degraded manner or in a degraded manner. The lower resolution image content may be enhanced in some manner to be suitable for displaying on a display having a resolution greater than the lower resolution image content, such as a 4K display (e.g., 3840 by 2160 pixels).

Restoration and/or enhancement of the image and/or video is often a processing step in an image/video display system, especially in large-sized displays. One of the goals may be to restore and enhance the visual appearance of important components of the image and/or video, for example edges, textures and other detail. Another goal is to limit the introduction of undesirable visual artifacts and/or amplification of existing artifacts during restoration and enhancement. A specific example is to limit the introduction or amplification of existing noise in the image and/or video, such as camera noise or compression noise. Another example is to limit introduction of artifacts near edges and contours known as "halo", "undershoot" and "overshoot".

Many different techniques have been used to attempt to perform image (inclusive of video) detail enhancement in order to restore an image. Many such techniques are based upon a hierarchical framework using a Laplacian pyramid to decompose the image into multiple levels, including a smooth low frequency image and other high frequency components. Each level is then enhanced and combined together to form the enhanced image. While decomposing the image, edge preservation techniques may be used to reduce halo effects.

Another technique to perform image detail enhancement involves applying a bilateral filter to get different components of the image under multiple lighting conditions and enhance the details of the image by combining these components. The range of the bilateral filter may be modified to simultaneously perform both detail enhancement and noise removal. Another technique includes acquiring information about oscillations of the image from local extrema at multiple scales and using this information to build a hierarchy which is used to enhance details of the image. Yet another technique involves using wavelets to build a multi-resolution analysis framework to decompose an image into smooth and its detail components, where the wavelets are specifically constructed according to the edge content of the image to reduce halo effects.

Another technique to perform image detail enhancement uses a filter to perform multi-scale decomposition of images. The filter is edge-preserving and the smoothing is based on a Weighted Least Squares (i.e., WLS) optimization framework. This may be mathematically represented as calculating the minimum of, $$\sum_p \left( (u_p - g_p)^2 + \lambda \left( a_{x,p}(g) \left( \left( \frac{\partial u}{\partial x} \right) \right)_p^2 + a_{y,p}(g) \left( \frac{\partial u}{\partial y} \right)_p^2 \right) \right)$$

where g is the input image, u is the output image and subscript p is the spatial location of the pixel. This function tries to maintain u as close as possible to g and achieves smoothness by minimizing the partial derivatives of u. The smoothness weight is determined by $a_x$ and $a_y$, while $\lambda$ controls the amount of smoothing. Greater $\lambda$ implies more smoothing. For example, this technique may be used in a Laplacian pyramid framework to obtain abstraction at different levels.

As previously described there are many different techniques to provide image enhancement together with increased resolution. For example, D. Glasner, S. Bagon, M. Irani, Super-resolution from a single image, ICCV 2009, describe the use of redundancies in the input image to construct a pyramid having low-res/high-res image pairs and uses a learning-based method to perform super-resolution of the input image. For example, J. Sun, J. Sun, Z. Xu, H. Y. Shum, Gradient Profile Prior, CVPR 2008, describe the use of a large database of natural images to learn the distribution of gradient profiles and modifies the gradient information of the input image to fit this distribution in order to obtain sharp edges and consequently perform super-resolution of images. For example, Yang, J. Wright, T. Huang and Y. Ma., Image super-resolution via sparse representation, IEEE TIP 2010, describe the use of a dictionary-based super-resolution method based on ideas in sparse signal processing and show how a joint compact dictionary can be trained to learn the correspondence between high-resolution and low-resolution training image patches. H. He, W. C. Siu., Single image super-resolution using Gaussian Process Regression, CVPR 2010, describe a super-resolution technique using a Gaussian Process Regression model without any training dataset. R. Fattal, Upsampling via imposed edge statistics, SIGGRAPH 2007, describe the use of a super-resolution method based on the relationship between the edge statistics based on local intensity continuity of low-resolution and the high-resolution images. W. Freeman, T. Jones, E. Pasztor, Example-based super-resolution, IEEE Computer Graphics and Applications 2002, describe using a technique to hallucinate high frequency details from a training set of high-resolution and low-resolution image pairs. Y. W. Tai, S. Liu, M. Brown, S. Lin, Super resolution using edge prior and single image detail synthesis, CVPR 2010, describe the use of an extended gradient profile technique using exemplar texture patches to get improved details in the image. J. Sun, J. Zhu, M. Tappen, Context constrained hallucination for image super-resolution, CVPR 2010, describe an image super-resolution technique formulated as an energy minimization framework that enforces different criteria such as fidelity of the high-resolution image to the input image, the fidelity of pixel to discrete candidate examples and the smoothness of edge. This method analyzes textural characteristics of a region surrounding each pixel to search database for segments with similar characteristics. All references described herein are incorporated by reference in their entirety.

Many existing techniques for detail enhancement, such as those mentioned above, are effective in enhancing the image and/or video. However, such techniques may still result in images that are not aesthetically pleasing to the viewer.

The foregoing and other objectives, features, and advantages of the invention will be more readily understood upon consideration of the following detailed description of the invention, taken in conjunction with the accompanying drawings.

DETAILED DESCRIPTION OF PREFERRED EMBODIMENT

While viewing an image or a video, the focus of a person is different for different regions of the image, depending on the content depicted therein. The various components of the image content drive people's attention to different regions of the image. In addition, the texture in the image also draws the attention of a person to particular portions of the image and determines whether the image is visually pleasing, such as for example, highly textured based regions of the image and edge based features of the image.

Figure 1:
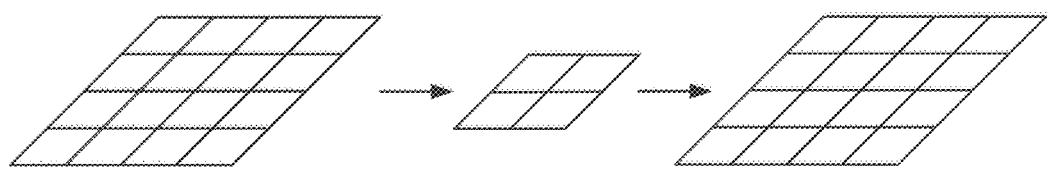
FIG. 1 illustrates an image degradation technique.
Figure 1:
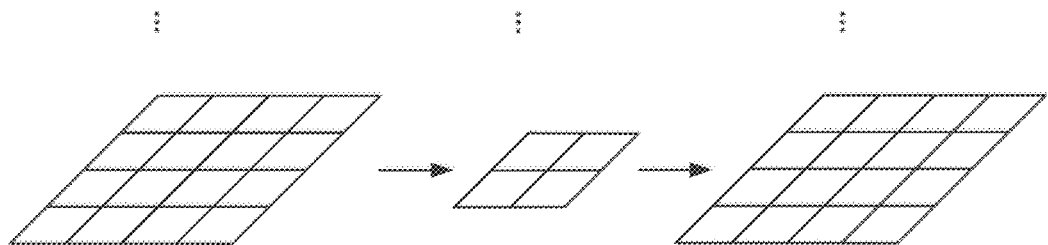
Figure 1:
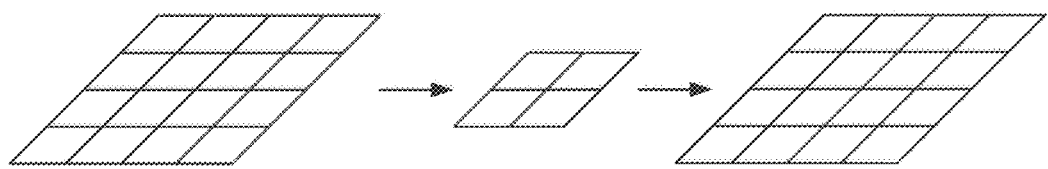

Referring to FIG. 1, the image enhancement technique may be based upon a set of high resolution training images 100. It is desirable to degrade the high resolution training images in a manner that is similar in nature of the enhancement to be provided to an input image. To achieve a suitable degradation of the high resolution images, each of the high resolution training images may be downsampled to a lower resolution training image 110. Then each of the downsampled lower resolution training images 110 may be upsampled to an upsampled higher resolution training image 120, such as the same resolution of the original high resolution training images or otherwise to the anticipated output resolution of the input image. Other statistical measures may likewise be used to suitably degrade the image quality of the high resolution training images 100.

Figure 2:
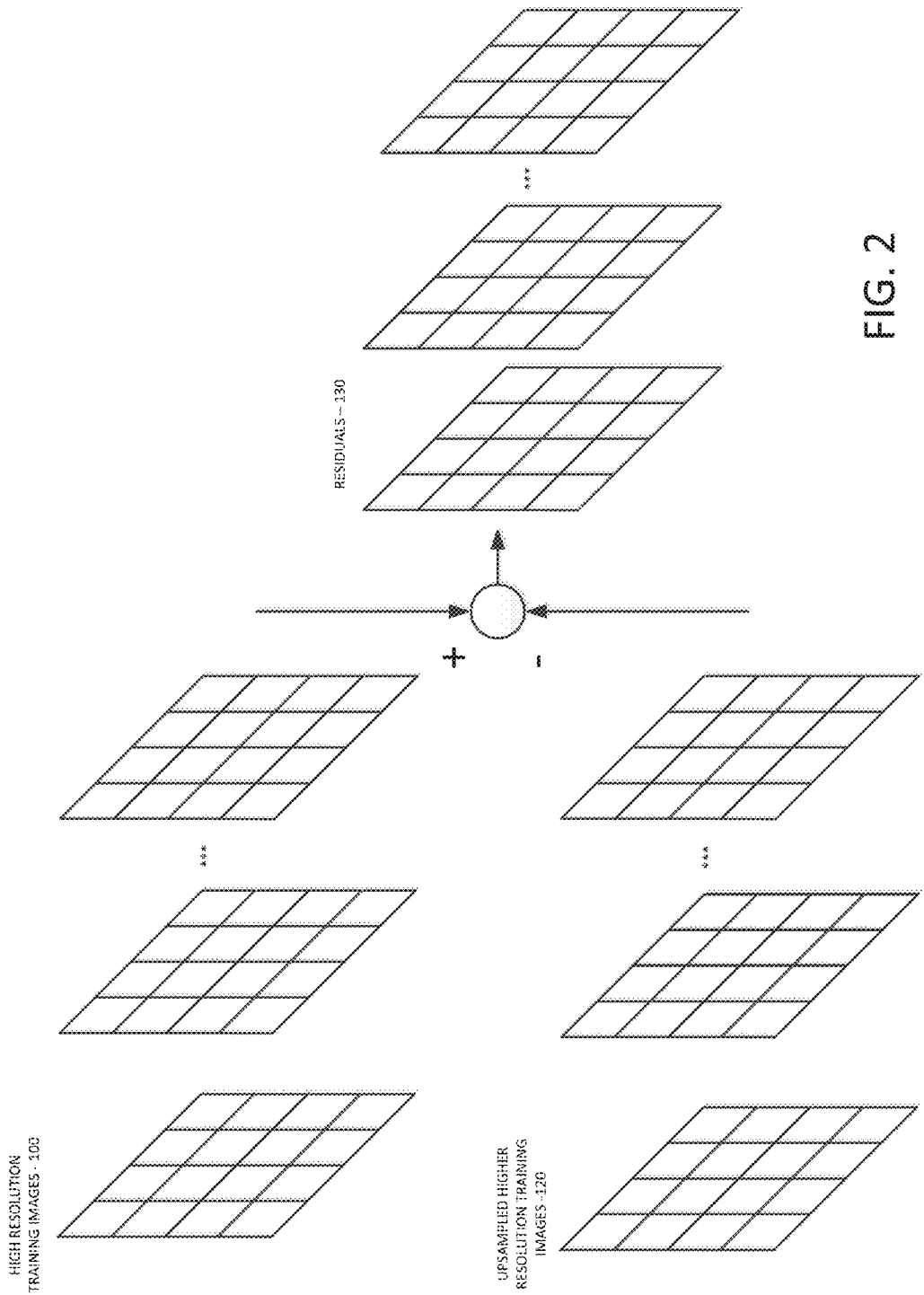
FIG. 2 illustrates a residual image calculation technique.

Referring to FIG. 2, it was determined that to maintain and/or emphasize the texture and edge based aspects of a lower resolution input image when its resolution is substantially increased, it is desirable to base the upscaling on a set of residuals 130 between the upsampled higher resolution training images 120 and the high resolution training images 100. Accordingly, it is desirable to determine the difference 140 between the pixels of each the upsampled higher resolution training images 120 and the corresponding high resolution training images 100. Other statistical measures may be used to characterize the relationship between the high resolution training images and corresponding degraded higher resolution training images.

In one embodiment, a database of high resolution training images may be used. The database may primarily consists of high-resolution images. Given a high resolution training image I_h, the system may generate upsampled higher resolution training images I_l as follows:

$$I_l = ((I_h * G) \downarrow) \uparrow \quad (1)$$

where * is the convolution operator, G is a Gaussian kernel, ↓ is the downsampling operator and ↑ is the upsampling operator. The downsampling and the upsampling operator may be performed with the desired scaling factor and may be used to mimic the degradation process. Instead of using the high-resolution images during training, the system use the differences (e.g., residue images) between each corresponding high-resolution training image and upsampled higher resolution training images. Residue images for training may be denoted by R=I_h−I_l. The residue images are used to focus on the relationship between the low-resolution images and the edges and texture content within the corresponding high-resolution images. Using residue images instead of directly using high-resolution images improves the reconstruction results.

The term "high-resolution" is used in general to mean high-quality image and/or video data, for example image data containing high-frequency components, and/or image data containing fine details and textures, and/or image data with sharp edges and contours and/or data with more pixels than the input data. The term "low-resolution" is used in general to mean image and/or video data that may have been degraded during capture, encoding or transmission, and generally contains fewer high-frequency components, and/or fewer detail and/or compression artifacts and/or fewer pixels than output data.

Figure 3:
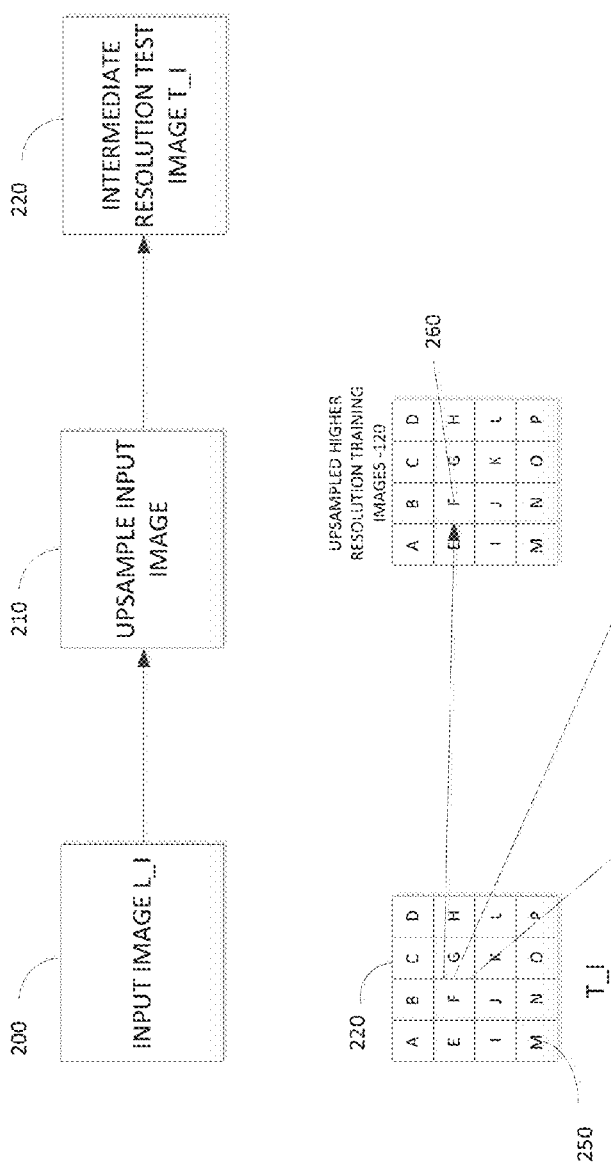
FIG. 3 illustrates an input image upsampling technique.

Referring to FIG. 3, the low resolution input image L_I 200 is preferably increased in resolution to a predetermined resolution for subsequent processing. The low resolution input image L_I 200 may be upsampled 210 using any suitable technique to determine an intermediate resolution test image T_I 220. Preferably, the size of the intermediate resolution test image T_I 220 is the same as the size of the upsampled higher resolution training images 120, although different sizes may be used, if desired. In addition, preferably the size of the intermediate resolution test image T_I 220 is the same size as the desired output from the upscaling of the low resolution input image L_I 200.

Figure 4:
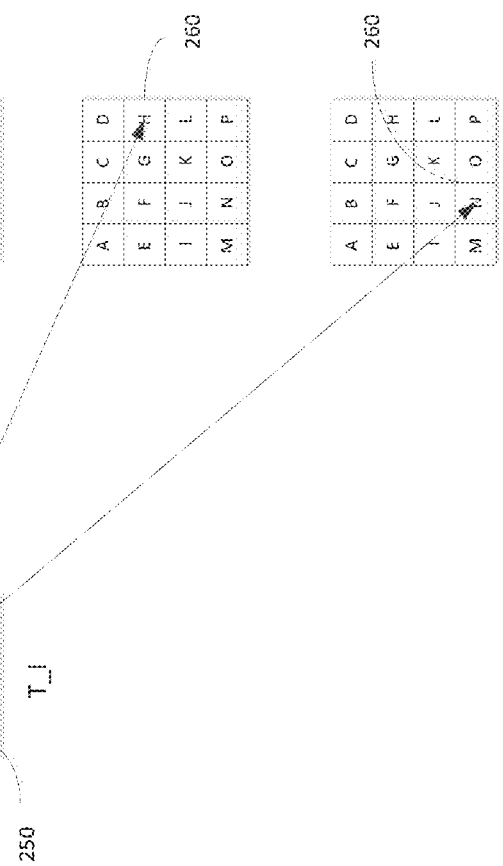
FIG. 4 illustrates a patch determination process.

Referring to FIG. 4, it is desirable to match patches 250A-250P of the intermediate resolution test image T_I 220 with each of the upsampled higher resolution training images 120. For example, patch 250F may be matched to each of the upsampled higher resolution training images 120 to determine a best match 260 in each of the higher resolution training images 120. Preferably, the patches 250A-250P are overlapping with one another so that a reduced number of edges of the patches are in common between any two adjacent patches. Any suitable technique may be used to determine the best match for each of the upsampled higher resolution training images 120.

For example, the matching process may use Patchmatch or Coherency Sensitive hashing (CSH). The CSH technique combines two different techniques, namely, PatchMatch and Locality Sensitive Hashing (LSH) to find matching patches between two images. The Patchmatch method uses information about the coherency between the images to propagate good matches to the neighbors. It uses random assignment of patches for initialization. LSH uses hashing technique to map similar patches to the same bin in order to find matching patches. CSH combines the concepts of image coherency from PatchMatch and the concepts of image appearance from LSH to search for matching patches. However, due to the presence of random initialization of PatchMatch, it is beneficial to have some redundancy amongst the patches that are present in the training database. While finding the best matching patch, the system considers patches from the intermediate resolution training images U. This is done in order to maintain the consistency of the degradation process. For every overlapping patch y present in T_I, the system seeks the best matching patch from each image present in the database.

Figure 5:
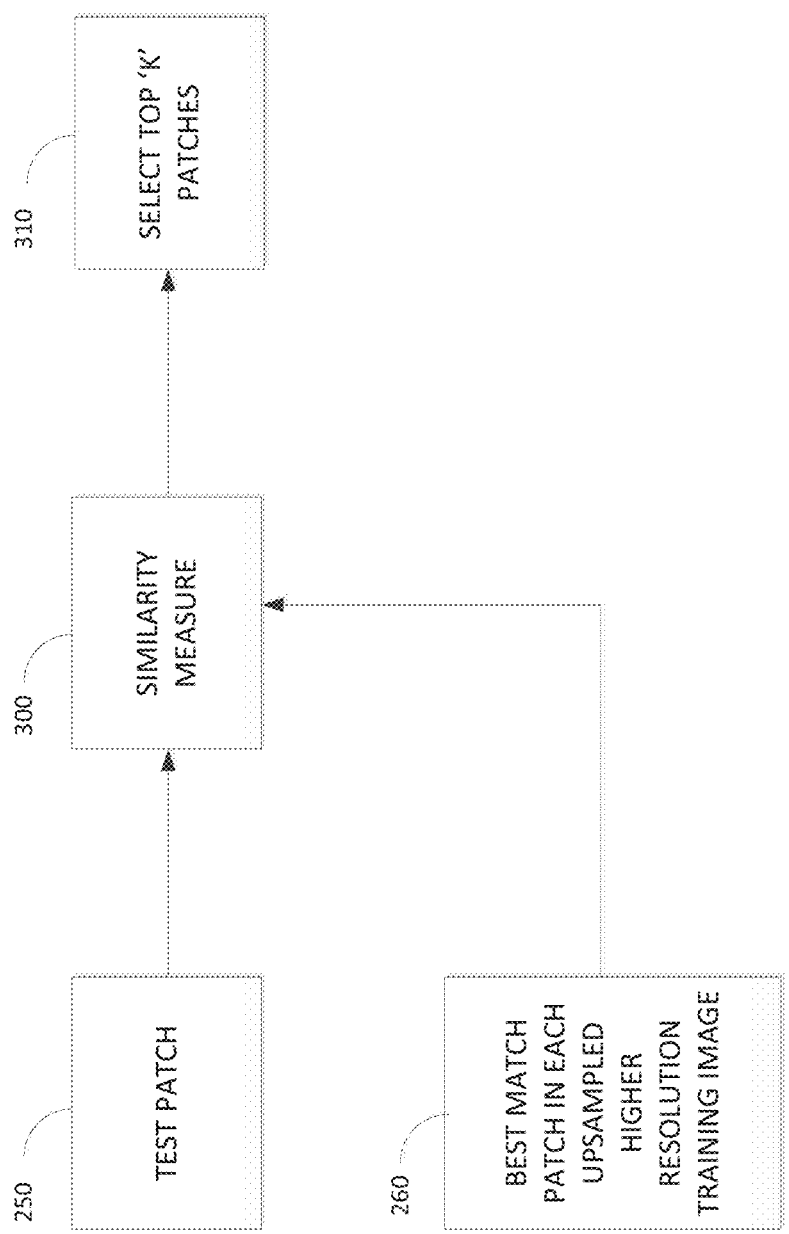
FIG. 5 illustrates a patch selection process.

Referring to FIG. 5, for some training images even the best matched patch for a particular training image will not be very representative of the patch 250 in the intermediate resolution test image T_I 220. To reduce the number of poor matches, it is desirable to determine a similarity measure 300, such as an Euclidean distance measure, between the test patch 250 and the best match patch in each upsampled higher resolution training image 260. Then the system selects the top 'k' patches 310.

Figure 6:
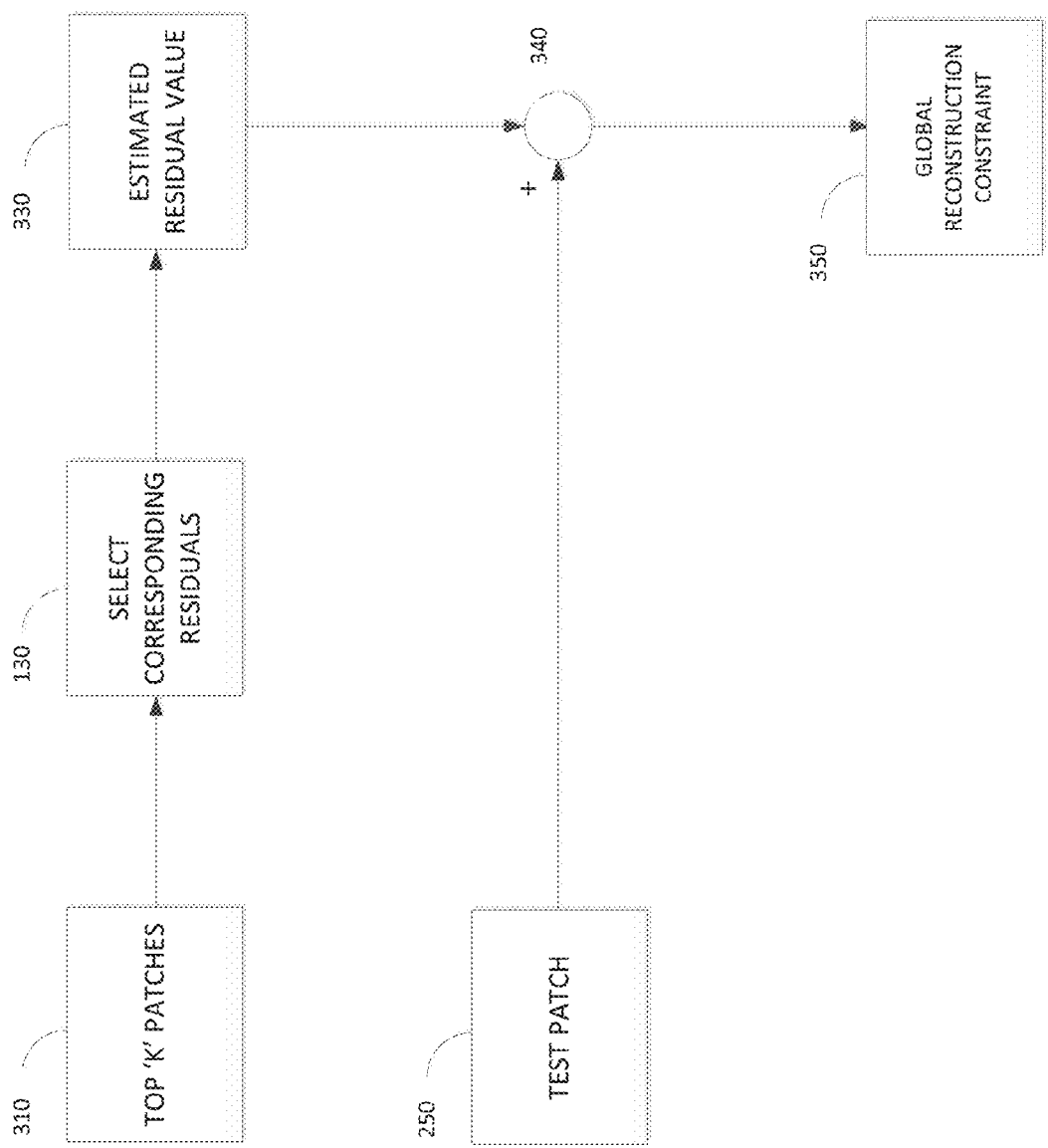
FIG. 6 illustrates a high resolution image reconstruction process.

Referring to FIG. 6, it is desirable to select each of the corresponding residuals 130 for each of the selected top 'k' patches 310. The residuals 130 belong to the same spatial location in the residue images as the corresponding matched patch in the upsampled higher resolution training image 260. A final estimated residue value 330 of a patch for an image location in the input image may be determined using any statistical measure based upon the selected top 'k' patches 310.

For example, the final estimation of the final residue value 330 of a patch for an image location may be obtained as the convex combination of residue patches given in the form:
$\hat{r} = \Sigma_{i=1,\ldots,k} w_i r_i$
where $w_i = (d_i)^{-1} / \Sigma_{j=1,\ldots,k}(d_j)^{-1}$ and $d_i = \|y - x_i\|^2$ for $i=1,\ldots,k$ and $\{d\_1, \ldots, d\_k\}$ are the estimation of distances between the input patch and the top k best matching patches from the database. This estimation may be calculated using an Euclidean distance.

The estimated residual value 330 is then combined 340 with the test patch 250 in some manner, such as by summation, to obtain a high resolution patch, such as, $\hat{y} = y + \hat{r}$. The overlapping high-resolution patches for the input image L_I 200 are combined together using any suitable technique to get a high-resolution output image.

Because the input low resolution image and the output high resolution image obtained by overlapping high resolution patches do not demand exact equality it is desirable to enforce a global reconstruction constraint 350. This reconstruction constraint may measure the difference between the low resolution input image L_I and the smoothed and the downsampled version of high resolution image I_H. For example, this may be obtained by minimizing the following function:

$$E(I_H | I_L) = |(I_H * G) \downarrow - L_I|^2,$$

where G is the spatial filter and $\downarrow$ is the downsampling operator. To minimize the above function, the system may use a gradient descent technique such as, $$I_H^{t+1} = I_H^t - \tau((I_H * G) \downarrow - L_I) \uparrow * G,$$

where G is the spatial filter with kernel standard variance of 1.6 for scaling factor of 4 and $\uparrow$ is the upsampling operator. This is an iterative process and $\tau$ is the step size of the gradient descent.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

I claim:

1. A method for determining a high resolution output image comprising:
   (a) receiving a low resolution image having a first resolution;
   (b) determining an intermediate high resolution image having a second resolution based upon said low resolution image, where the second resolution is greater than the first resolution;
   (c) determining a set of matches between a patch of said intermediate high resolution image and each of a plurality of degraded high resolution images;
   (d) selecting a subset of said set of matches and determining a corresponding residue patch for each of said subset of said set of patches;
   (e) modifying said intermediate high resolution image based upon said corresponding residue patches to determine said high resolution output image.

2. The method of claim 1 wherein said degraded high resolution images are obtained by downsampling other high resolution images.

3. The method of claim 2 wherein said degraded high resolution images are further obtained by upsampling said other high resolution images.

4. The method of claim 1 wherein said degraded high resolution images are obtained from other high resolution images using a statistical measure.

5. The method of claim 1 wherein said residue patch for each of said degraded high resolution images is based upon a comparison between an original high resolution image and corresponding said degraded high resolution image.

6. The method of claim 5 wherein said comparison is a statistical measure.

7. The method of claim 1 wherein said intermediate high resolution image has the same pixel dimensions as said high resolution output image.

8. The method of claim 1 wherein said degraded high resolution images have the same pixel dimensions as said high resolution output image.

9. The method of claim 1 further determining a plurality of said set of matches between a corresponding plurality of patches of said intermediate high resolution image and each of said plurality of degraded high resolution images.

10. The method of claim 9 wherein said plurality of patches are spatially overlapping with one another.

11. The method of claim 1 wherein said matches are based upon a patchmatch technique.

12. The method of claim 1 wherein said matches are based upon a coherency sensitive hashing.

13. The method of claim 1 wherein said matches are based upon a local sensitive hashing.

14. The method of claim 1 wherein said selecting said subset is based upon a set of statistical measures.

15. The method of claim 14 wherein said statistical measures is a distance metric.

16. The method of claim 15 wherein said distance metric is an Euclidean distance.

17. The method of claim 1 wherein said modifying said intermediate high resolution image based upon said corresponding residue patches to determine said high resolution output image is based upon a weighted measure of said corresponding residue patches.

\* \* \* \* \*